United States Patent
Robin et al.

[11] Patent Number: 5,993,899
[45] Date of Patent: Nov. 30, 1999

[54] OPTICAL FIBER PREFORM AND ITS FABRICATION PROCESS

[75] Inventors: Thierry Robin, Asnieres; Jean-François Chariot, Marly le Roi, both of France

[73] Assignee: Alcatel Fibres Optiques, Bezons Cedex, France

[21] Appl. No.: 08/903,174

[22] Filed: Jul. 30, 1997

[30] Foreign Application Priority Data

Jul. 31, 1996 [FR] France ................................ 96 09647

[51] Int. Cl.⁶ .................. B05D 5/06; G02B 6/02
[52] U.S. Cl. ............... 427/163.2; 65/420; 385/123; 385/127; 427/402; 427/237; 427/255.18; 427/255.37
[58] Field of Search ................ 427/163.2, 402, 427/237, 255.18, 255.37; 65/3.12, 420; 385/123, 127

[56] References Cited

U.S. PATENT DOCUMENTS

| | | | |
|---|---|---|---|
| 4,217,027 | 8/1980 | MacChesney | 350/96.3 |
| 4,257,797 | 3/1981 | Andrejco | 65/3.12 |
| 4,518,407 | 5/1985 | Black et al. | 65/3.12 |
| 4,579,571 | 4/1986 | Hicks, Jr. | 65/3.12 |
| 4,932,990 | 6/1990 | Michie et al. | 65/3.12 |

FOREIGN PATENT DOCUMENTS

| | | |
|---|---|---|
| 0301797 | 2/1989 | European Pat. Off. . |
| 3430197A1 | 2/1986 | Germany . |

OTHER PUBLICATIONS

Patent Abstracts of Japan, vol. 5, No. 194 (C–82), Dec. 10, 1981 corresponding to JP 56 114842 A (Fujitsu Co., Ltd.) dated Sep. 9, 1981.

A. Hordvik et al. "A Method for Reducing the Conicalness of the Core Diameter in Preforms Made by the MCVD Process", ECOC VII: Conference Proceedings, Sep. 8–11, 1981, Copenhague, DK, pp. 1.3–1–1.3–4.

Patent Abstracts of Japan, vol. 6, No. 143 (C–117) Aug. 3, 1982 correspondig to JP 57 067041 A (NT&T Corp.) Apr. 23, 1982.

*Primary Examiner*—Janyce Bell
*Attorney, Agent, or Firm*—Sughrue, Mion, Zinn, Macpeak & Seas, PLLC

[57] ABSTRACT

A process of fabricating an optical fiber preform, preferably a multimode optical fiber preform, having a maximum refractive index along an axis of the fiber and a lower refractive index at its periphery. The process includes the following steps: depositing successive layers onto the interior of the tube with the refractive index increasing from the first, larger diameter layer to the central layer, each layer being formed from gases which react with each other inside the tube, and varying the proportions of the gases from one layer to another to vary the index. The gases are introduced into the tube at a velocity such that the radial index profile is homogenized in the longitudinal direction. This velocity is advantageously maintained substantially the same for the fabrication of all the layers. This process produces preforms having a homogeneous index profile in the longitudinal direction.

13 Claims, 1 Drawing Sheet

OPTICAL FIBER PREFORM AND ITS FABRICATION PROCESS

BACKGROUND OF THE INVENTION

1. Field of the Invention

The invention concerns an optical fiber preform and a fabrication process for this preform.

2. Description of the Prior Art

An optical fiber is generally made from silica; its diameter is about 125 microns ($\mu$m).

The silica of a multimode optical fiber is doped. The doping, for example, with germanium, is highest at the center, i.e. on the longitudinal axis, and decreases from the center towards the periphery. Accordingly, the refractive index n is the highest at the center, where its value is about 1.48, and lowest at the periphery, where its value is about 1.45, which is the index of the pure silica.

The performance of the fiber depends on the quality and the regularity of the index profile. The bandwidth is high if the index profile is regular, i.e. if the refractive index varies continuously or virtually continuously from the center towards the periphery and if the curvature of this profile is chosen correctly. Furthermore, the bandwidth depends on the longitudinal homogeneity of the index profile. Any departure from these conditions—i.e. if the index gradient has discontinuities and/or is not homogeneous in the longitudinal direction—leads to a reduction of the bandwidth. Finally, oscillations or undulations of the index profile can degrade the bandwidth to a lesser degree.

An optical fiber having a satisfactory index gradient is fabricated in the following manner: starting with a tube of pure silica having an exterior diameter between 28 mm and 36 mm and an interior diameter between 24 mm and 32 mm, for example, successive layers are deposited on the internal wall with the doping increasing from the beginning (the largest diameter) to the end (the smallest diameter). Generally there are several tens of layers.

The process employed is a modified chemical vapor deposition (MCVD) process.

To deposit the first layer a current of silicon tetrachloride $SiCl_4$ mixed with oxygen or another oxidizing agent is passed through the interior of the silica tube and the silica tube is heated, preferably from the exterior. The heating is effected over a relatively short length; to form the layer over the greater part of the tube, the heating device is moved from the entry towards the exit of the tube. The tube is generally turned about its axis during execution of the process.

The heating causes oxidation of the silicon tetrachloride and this produces silica $SiO_2$ and chlorine. The silica is deposited onto the inside wall of the tube and constitutes the first layer.

The subsequent layers are formed in the same manner but, for these layers, the gas additionally contains germanium tetrachloride to effect the doping. The quantity of germanium tetrachloride is varied from the second layer to the last in order to obtain the required doping—and therefore the required index—for each layer.

After deposition of the last layer, there remains an axial opening that is eliminated by heating the tube in order to shrink it. This produces a solid cylinder having an outside diameter in the order of two centimeters and a length of about one meter. This cylinder, or rod, is known as a primary preform. This primary preform is generally then covered (or "surfaced") with silica to obtain the required diameter, for example three centimeters to four centimeters.

The optical fibers proper are fabricated by drawing down such preforms. Thus a preform about one meter long and having an outside diameter of three centimeters produces in the order of 50 kilometers of optical fiber with a diameter of 125 microns.

The preform fabrication process described hereinabove is described in European patent application 301 797, for example.

It has been found that, during the fabrication of a preform by the MCVD process, a great part of the length of the preform has an index profile that differs from the profile over the remainder of the length of the preform. This lack of longitudinal homogeneity leads to a reduction of the bandwidth of the optical fibers made from this part of the preform. The lack of homogeneity of the index profile in relation to the remainder of the length manifests itself at the gas entry end, following on from a first part, starting from the entry, over which the deposit is insufficient. This first part is about 15 centimeters long. The second part, which has a varying index profile curvature different from the corresponding curvature over the remainder of the preform, extends about 10 to 15 centimeters beyond the first part. The lack of homogeneity of the doping gradient or index gradient of the second part relative to the remainder affects the bandwidth of the fiber obtained from this part or from the remainder of the preform. To summarize: about 15% of the preform is unusable and an at least—and possibly much greater—proportion of this length suffers from a lack of homogeneity of the index profile relative to the remainder of the preform, the above values being given by way of example only. Be this as it may, it has been found that the lack of homogeneity indicated above increases with the section of the layers deposited. This drawback is particularly disadvantageous at present since the aim is to obtain preforms of even greater diameter.

SUMMARY OF THE INVENTION

A preform in accordance with the invention does not have the second length with a different bandwidth. This preform therefore has only two parts, namely an unusable entry part where the deposit is insufficient and the remainder of the tube along which the radial refractive index gradient remains the same from one end to the other.

The invention also concerns a fabrication process for a preform of the above kind. In this process, the velocity at which the gases used to fabricate the successive layers are introduced is chosen, for each layer, to obtain longitudinal homogeneity of the index profile. This velocity preferably varies little or is substantially constant for all the layers.

The invention is based on the observation that in prior art multimode optical fiber fabrication processes the velocity of the gases introduced into the tube varies significantly between the first and last layers deposited and that it is this significant variation in velocity that causes the formation of said second part of the tube along which the index profile has a different curvature to the curvature of the same profile over the last part of the tube.

The formation of the part with the different curvature index profile can be explained in the following manner: the gases that are introduced into the tube, with a particular velocity v in the axial direction, start to produce deposits on the internal wall of the tube only from an abscissa which is a direct function of the velocity v and the radius of the wall exposed to the gases. Accordingly, during the production of the first layers, for which the velocity v is highest, the deposits start at the greatest distance from the entry of the tube. For the last layers, for which the velocity v at which the gases introduced is the lowest, the deposits start at a substantially smaller distance from the entry of the tube.

On the other hand, with the invention, the velocity v with which the gases are introduced being controlled, it is believed that the abscissa at which the layers start can be kept the same at all times.

However, this explanation is not limiting on the invention. It is not indispensable for the abscissa at which the layers start to always be the same.

To control the entry velocity of the gases, whilst maintaining the longitudinal homogeneity of the radial profile, in one embodiment of the invention the flowrate of the oxygen (or of another oxidizing agent) is varied from one layer to another. In contrast to the prior art process, the constraint of an oxygen flowrate enabling constant reaction yields is not imposed.

Compared to the prior art process, this variation in the oxygen flowrate entails the necessity—in order to preserve the required profile—of varying the flowrate of the silica and germanium (doping product) generating gases in order to preserve the quality of the profile. However, experience has shown that such variations in the flowrates of the silica and germanium generating gases have relatively little effect on the velocity of the gases, which makes control of fabrication relatively easy.

In other words, although the flowrates of the silica and germanium generating gases, and therefore the parameters of the layers, are related to the velocity v at which these gases are introduced, this velocity v can nevertheless be controlled because the variations in the flowrates of the generating gases have only a second order effect on the velocities of the gases.

Other features and advantages of the invention will emerge from the description of particular embodiments of the invention given with reference to the accompanying drawings.

BRIEF DESCRIPTION OF THE DRAWINGS

FIG. 1b is a diagram representing the variation in the radial direction of the refractive index within the fiber from FIG. 1a.

DETAILED DESCRIPTION OF THE PREFERRED EMBODIMENTS

Figure 1A:
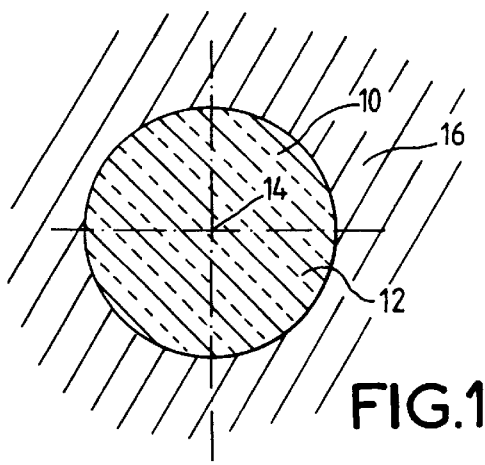
FIG. 1a is a schematic cross-section of an optical fiber.

FIG. 1a is a schematic cross-section of a multimode fiber optical conductor. The optical fiber 10 has a diameter of about 125 microns. It is protected by a cladding 12.

Figure 1B:
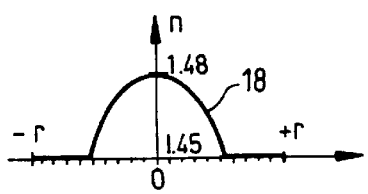

The multimode optical fiber 10 must have the refractive index "n" profile shown in FIG. 1b. In this diagram, the origin "0" corresponds to the center 14 of the cross-section, i.e. to the longitudinal axis of the fiber 10, and the abscissae "r" and "–r" correspond to the periphery 16 of the fiber.

The fiber 10 is fabricated from silica $SiO_2$. The silica $SiO_2$ is pure at the periphery. The refractive index therefore has the value 1.45 at and near the abscissae r and –r. On the other hand, the core is doped with germanium, which modifies the refractive index. The index has a value of 1.48 at the center 14 and decreases progressively towards the periphery, as shown by the curve 18 (FIG. 1b).

For correct operation of the optical fiber, and in particular for an optimum bandwidth, it is essential for the curve 18 to be regular. It is also preferable for the curve 18 to have minimal undulations.

This result is obtained by controlling the fabrication of the fiber 10.

A fiber of this kind is fabricated in the following manner—which is known in itself.

The process starts with a tube 20 (FIG. 3) of silica, having an inside diameter of 30 mm, an outside diameter of 34 mm and a total length "L" between 1 meter and 1.4 meters, for example. Gases represented by the arrow 24 are introduced into the silica tube 20 from its entry end 22. The MCVD process is used to form a plurality of successive layers $26_1$, $26_2$, . . . $26_n$, the doping of which varies from the layer $26_1$ to the layer $26_n$ (FIG. 2) in such manner as to obtain the index profile 18 shown in FIG. 1b. The layer $26_1$ is the first layer deposited on the internal wall 21 of the tube 20. A second layer $26_2$ is deposited on the first, and so on.

In this example, the cross-section of the layers decreases from the periphery $26_1$ to the central layer $26_n$. The doping with germanium is greatest for the central layer $26_n$ and decreases towards the periphery. The first layer $26_1$ is not doped.

In practise, for the fabrication of the first layer $26_1$, the gases 24 comprise only silicon tetrachloride $SiCl_4$ and oxygen. The process consists in causing the oxygen and the silicon tetrachloride to react to produce silica $SiO_2$ by the following reaction:

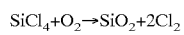

$$SiCl_4+O_2 \rightarrow SiO_2+2Cl_2$$

The subsequent layers are obtained in the same way but germanium tetrachloride $GeCl_4$ is added to effect the doping.

The total flowrate of the chlorides is generally reduced from one layer to the next to obtain layers whose cross-section decreases from the periphery $26_1$ to the core $26_n$.

Each layer is fabricated progressively in the longitudinal direction, from the entry opening 22 to the exit end 28, using a heating device 30—such as a torch—which is moved from the entry 22 towards the exit 28 in the direction of the arrow "F". The heating device 30 therefore heats the tube locally from the exterior to trigger the chemical reactions forming silica $SiO_2$ and doping product and to vitrify the materials obtained.

To homogenize the fabrication of the layers the tube 20 is turned about its axis $20_1$.

Figure 2:
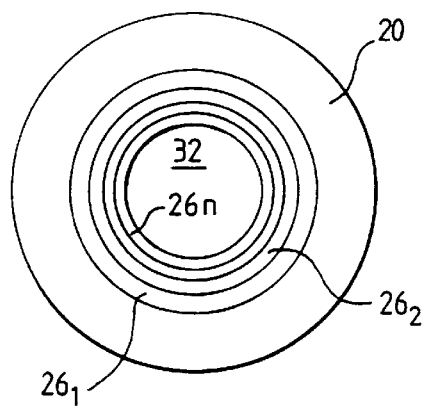
FIG. 2 is a schematic section of an optical fiber preform during fabrication.
Figure 3:
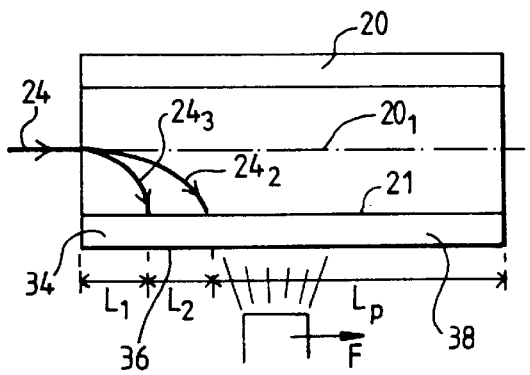
FIG. 3 is a schematic of a prior art preform fabrication process.

After the various layers are formed a tubular product shown in FIG. 2 is obtained, in other words there remains a central hole 32. Fabrication of the preform is terminated by heating the entire product in order to shrink it to eliminate the central opening 32.

With the process used until now, it has been found that the preform obtained has three parts along its axis: a first part 34 of length $L_1$ in which there are no layers or only thin layers, a second part 36 of length $L_2$, almost equal to the length $L_1$, in which the index profile 18 is not optimum, does not always meet the specifications and is often close to a rejection limit, and finally a third part 38 of length $L_p$ for which the profile 18 is of practically constant quality and, in theory, optimal. It has also been found that the length $L_2$ increases with the cross-section deposited and with the cross-section gradient of the layers.

The part 34 of length $L_1$ is explained (in somewhat simplified fashion) by the fact that the gases 24 enter the tube 20 with a non-negligible velocity v that must be maintained for these gases to pass through the tube 20. Consequently, the solid deposits can form only beyond an abscissa $L_1$. After shrinkage, the part 34 forms a conical or frustoconical part of the preform.

The part 36 the index profile 18 of which is different from the profile over the part 38 originates in the fact that the velocity v of the gases 24 is highest during fabrication of the first layer $26_1$ and lowest during fabrication of the layer $26_n$. Accordingly the deposits start nearer the end 22 for the last layer than for the first layer. The arrow $24_2$ symbolizes the start of the first layer $26_1$ and the arrow $24_3$ symbolizes the start of the layer $26_n$.

The preform of the invention has only two parts 34 and 38 (FIG. 4); it does not include the part 36.

To obtain a preform of this kind, in one embodiment the velocity at which the gases 24 are introduced is maintained substantially constant during the fabrication of the various layers $26_1$, $26_2$, ... $26_n$. The part 38 therefore starts at the abscissa $L_1$.

Figure 4:
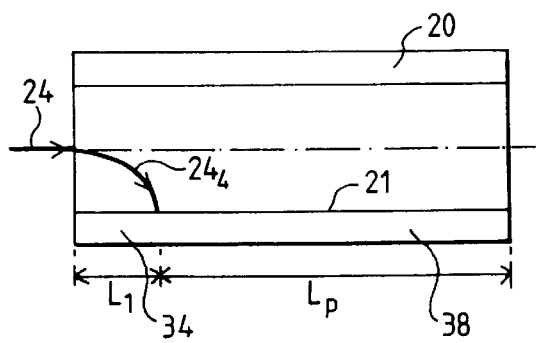
FIG. 4 is a schematic showing the preform and the process of the invention.

This process is illustrated by the arrow 244 in FIG. 4.

By "substantially constant velocity" is meant a velocity that does not vary much or at all from the first layer to the last. It is not necessarily strictly constant. For example, it can be beneficial for it to increase slightly between the first layer and the last. As the layers are deposited, the inside diameter decreases, the consequence of which is a slight decrease in the abscissa at which the formation of the layers starts if the velocity remains constant. On the other hand, if the velocity increases slightly the abscissa at which the layers start can remain constant.

To maintain the velocity $24_4$ of the gases 24 substantially constant from the first layer to the last, the oxygen flowrate is varied, in contrast to the prior art process. This variation of the flowrate leads to a variation of dilution. Obviously, to preserve a satisfactory index profile, the oxygen dilution variation entails variation of the necessary flowrates of silicon and germanium chloride compared to the flowrates used in the prior art processes. These flowrate variations are determined empirically. It has been found that, despite the additional constraint imposed by the fact that the velocity of the gases is to be maintained constant (or controlled), the required index profile can easily be obtained. The velocity v at which the gases are introduced can be controlled in a manner that is virtually independent of the flowrate of $SiCl_4$ and $GeCl_4$.

The velocity of the gases is generally chosen, for example, by varying the oxygen flowrate, to obtain an index profile that is homogeneous in the longitudinal direction.

Figure 5:
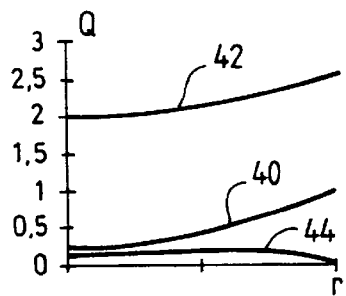
FIG. 5 is a diagram relating to the process of the invention.

In the FIG. 5 diagram, the origin corresponds to the axis 14 and therefore to the last layer formed. The abscissa r corresponds to the inside wall 21 and therefore to the first layer. The flowrates Q are plotted on the ordinate axis. The curve 42 represents the oxygen flowrate variations when the velocity v is maintained constant. The curves 40 and 44 respectively show the variations in the $SiCl_4$ and $GeCl_4$ flowrates under the same conditions.

In this example, the oxygen flowrate 42 decreases with the rank of the layer. However, this reduction is in a lower proportion than the reduction of the total flowrate of the salts.

Although the example described concerns a germanium doped silica fiber, it is obvious that the invention encompasses any other dopant. Furthermore, additional dopants, for example phosphorus, can be used in addition to germanium.

In one embodiment a neutral gas such as helium is added to the reaction gases, among other things to control the velocity of the gases.

Any other oxidizing product enabling the fabrication of silica $SiO_2$ can be used in place of the oxygen.

The invention also applies to the fabrication of a monomode fiber in which the index profile is practically rectangular. Accordingly, the invention is generally concerned with a process for fabricating an optical fiber having a maximum refractive index along the axis of the fiber and a lower refractive index at its periphery, this process consisting in depositing, onto the interior of a tube, successive layers such that the refractive index of the first, larger diameter layers is lower than the refractive index of the central layers, each layer being formed from gases which react with each other inside the tube, and the proportions of the gases are varied to vary the index, this process being characterized in that the velocity v at which the gases are introduced into the tube is chosen to homogenize the radial index profile in the longitudinal direction.

There is claimed:

1. A process for fabricating a multimode optical fiber preform having a maximum refractive index along an axis of the fiber and a lower refractive index at its periphery, said process including the following steps:

depositing successive layers onto the interior of the tube with the refractive index increasing from the first, larger diameter layer to the central layer, each layer being formed from gases which react with each other inside said tube, and varying the proportions of said gases from one layer to another to vary said index, wherein said gases are introduced into said tube at a velocity v such that the radial index profile is homogenized in the longitudinal direction, and wherein said velocity v is substantially the same for fabrication of all said layers.

2. The method claimed in claim 1 wherein said tube is of silica.

3. The method claimed in claim 2 wherein said gases comprise a silicon salt, a doping product salt, and an oxidizing product, and the flowrate of said oxidizing product varies during the fabrication of the various layers.

4. The method claimed in claim 3 wherein the flowrate of said salts decreases with a rank of the layer and the flowrate of said oxidizing product decreases with the rank of the layer but to a lesser degree than the decrease in the flowrate of said salts.

5. The method claimed in claim 3 wherein the doping product salt is a germanium salt and the oxidizing product is oxygen.

6. The method claimed in claim 2 wherein said gases comprise a silicon salt, a doping product salt and an oxidizing product and the velocity at which said gases is introduced is controlled independently of the flowrate of said silicon salt and said doping product salt.

7. The method claimed in claim 6 wherein the oxidizing product is oxygen.

8. The method claimed in claim 1 wherein a neutral gas is added to said gases which react with each other.

9. The method claimed in claim 1 wherein said velocity v is chosen so that the abscissa at which all said layers start is substantially constant.

10. Preform for fabricating a multimode optical fiber having a refractive index that varies from its center to its periphery, said refractive index being higher at the center, along the axis, than at the periphery, said preform having only two parts in the longitudinal direction, a first part constituting an entry cone and a second part having an index profile that is practically constant throughout its length.

11. A process for fabricating a multimode optical fiber preform having a maximum refractive index along an axis of the fiber and a lower refractive index at its periphery, said process including the following steps:

depositing successive layers onto the interior of the tube with the refractive index increasing from the first, larger diameter layer to the central layer, each layer being formed from gases which react with each other inside said tube, and varying the proportions of said gases from one layer to another to vary said index, wherein said gases are introduced into said tube at a velocity v such that the radial index profile is homogenized in the longitudinal direction, and wherein said velocity v at which said gases are introduced increases with each layer from a first to last layer fabricated.

12. Process for fabricating an optical fiber having a maximum refractive index along with the axis of said fiber and a lower refractive index at its periphery, said process including the following steps:

depositing successive layers on the interior of a tube so that the refractive index of the first, larger diameter layers is lower than the refractive index of the central layers, each layer being formed from gases that react with each other within said tube, and varying the proportions of said gases to vary said index, wherein a velocity v at which said gases are introduced into said tube is chosen to homogenize the radial index profile in the longitudinal direction, and wherein said velocity v is substantially the same for fabrication of all said layers.

13. Process for fabricating an optical fiber having a maximum refractive index along with the axis of said fiber and a lower refractive index at its periphery, said process including the following steps:

depositing successive layers on the interior of a tube so that the refractive index of the first, larger diameter layers is lower than the refractive index of the central layers, each layer being formed from gases that react with each other within said tube, and varying the proportions of said gases to vary said index, wherein a velocity v at which said gases are introduced into said tube is chosen to homogenize the radial index profile in the longitudinal direction, and wherein said velocity v at which said gases are introduced increases with each layer from a first to last layer fabricated.

* * * * *